United States Patent
Oikawa et al.

(10) Patent No.: US 10,444,727 B2
(45) Date of Patent: Oct. 15, 2019

(54) NUMERICAL CONTROL DEVICE OF MACHINE TOOL

(71) Applicant: FANUC CORPORATION, Yamanashi (JP)

(72) Inventors: Kouki Oikawa, Yamanashi (JP); Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/914,521

(22) Filed: Mar. 7, 2018

(65) Prior Publication Data

US 2018/0259930 A1    Sep. 13, 2018

(30) Foreign Application Priority Data

Mar. 10, 2017   (JP) .................. 2017-046349

(51) Int. Cl.
| | | |
|---|---|---|
| G05B 19/18 | (2006.01) | |
| G05B 19/41 | (2006.01) | |
| H02P 21/12 | (2016.01) | |
| H02P 21/26 | (2016.01) | |

(52) U.S. Cl.
CPC .. *G05B 19/182* (2013.01); *G05B 2219/37389* (2013.01); *G05B 2219/45129* (2013.01); *G05B 2219/45145* (2013.01)

(58) Field of Classification Search
CPC ........ G05B 2219/37389; G05B 19/182; G05B 2219/41391
USPC ...................................... 700/160
See application file for complete search history.

(56) References Cited

U.S. PATENT DOCUMENTS

| | | | | |
|---|---|---|---|---|
| 5,933,353 A | * | 8/1999 | Abriam ............... | G05B 19/4097 700/171 |
| 2008/0048607 A1 | * | 2/2008 | Kono .................. | H02P 21/12 318/802 |
| 2010/0114359 A1 | * | 5/2010 | Kommareddy .... | G05B 19/4093 700/173 |

FOREIGN PATENT DOCUMENTS

| | | |
|---|---|---|
| JP | S62-217896 A | 9/1987 |
| JP | S63-15697 A | 1/1988 |
| JP | 2015-228793 A | 12/2015 |

* cited by examiner

*Primary Examiner* — Michael J Brown
(74) *Attorney, Agent, or Firm* — Studebaker & Brackett PC

(57) ABSTRACT

An object is to provide the numerical control device of a machine tool which can achieve both a reduction in heat generation and stability in heavy cutting. A numerical control device includes a command transmission portion which transmits a speed command value and a magnetic flux command value to the spindle control portion of a machine tool and a storage portion which stores magnetic flux amounts corresponding to tools that may be used in the machine tool. The numerical control device also includes a tool detection portion which detects a tool selected in the machine tool and a magnetic flux amount setting portion which commands the command transmission portion to read, from the storage portion, a magnetic flux amount corresponding to the tool detected by the tool detection portion and to output the magnetic flux amount to the spindle control portion of the machine tool.

1 Claim, 2 Drawing Sheets

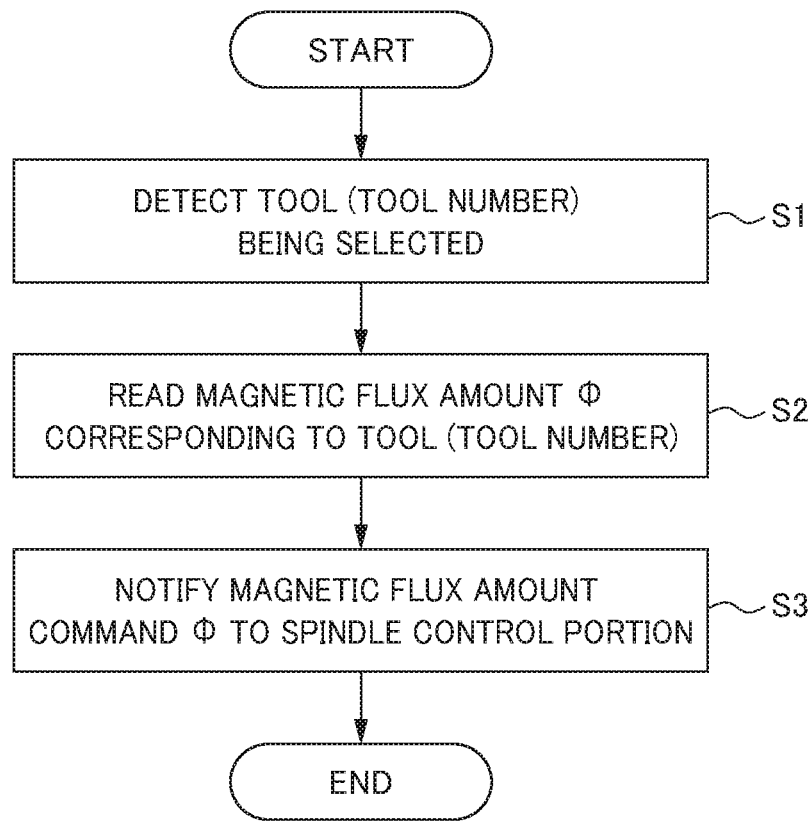

NUMERICAL CONTROL DEVICE OF MACHINE TOOL

This application is based on and claims the benefit of priority from Japanese Patent Application No. 2017-046349, filed on 10 Mar. 2017, the content of which is incorporated herein by reference.

BACKGROUND OF THE INVENTION

Field of the Invention

The present invention relates to the numerical control device of a machine tool.

Related Art

Conventionally, in a machine tool, as the spindle motor thereof, an induction motor may be used. Here, the induction motor refers to a motor in which an excitation current is passed through a stator coil so as to generate a rotating magnetic field and to generate an induced current in a rotor, and in which by the electromagnetic force thereof, the rotor is rotated so as to follow the rotation of the rotating magnetic field. Disadvantageously, in the induction motor, the excitation current is passed through the stator coil, and thus heat is generated. In order for this disadvantage to be avoided, there is a technology in which when a load for the induction motor is light such that a high torque is not required, the magnetic flux of the rotating magnetic field or the excitation current is reduced.

As a conventional technology on the control device of an electric motor (induction motor), there is an invention disclosed in Patent Document 1. As a conventional technology on a magnetic flux control method for an electric motor (motor), there is an invention disclosed in Patent Document 2. Furthermore, as a conventional technology on an alternating-current spindle motor control method, there is an invention disclosed in Patent Document 3.

Patent Document 1: Japanese Unexamined Patent Application, Publication No. 2015-228793
Patent Document 2: Japanese Unexamined Patent Application, Publication No. S62-217896
Patent Document 3: Japanese Unexamined Patent Application, Publication No. S63-015697

SUMMARY OF THE INVENTION

However, in a case where these technologies are used, when in a state where the torque is lowered by the reduction of the magnetic flux of the induction motor serving as the spindle motor, an axis drive motor is used to start heavy cutting (cutting whose cutting resistance is high) in which a large load is provided to the spindle motor, an abrupt load variation when the cutting is started may cause the speed of the spindle to be significantly lowered or cause the spindle to be stopped, with the result that stability in the heavy cutting may not be provided.

In this regard, Patent Document 1 only discloses a technology for storing an iron loss compensation current according to the torque. Patent Document 2 also only discloses a technology for measuring a relationship between a magnetic flux command and an excitation inductance at the time of no load so as to store it. Furthermore, Patent Document 3 only discloses a technology for controlling a spindle motor (controlling it by inputting a speed command and an excitation current command) in a numerical control device.

In view of such circumstances, the present invention has an object to provide the numerical control device of a machine tool which can achieve both a reduction in heat generation and stability in heavy cutting.

(1) A numerical control device (for example, a numerical control device 20 which will be described later) of a machine tool according to the present invention which controls the machine tool (for example, a machine tool 10 which will be described later) including a spindle control portion (for example, a spindle control portion 11 which will be described later) for driving a spindle motor (for example, a spindle motor 12 which will be described later) includes: a command transmission means (for example, a command transmission portion 21 which will be described later) which transmits a speed command value and a magnetic flux command value to the spindle control portion; a storage means (for example, a storage portion 22 which will be described later) which stores magnetic flux amounts (for example, magnetic flux amounts Φ which will be described later) corresponding to tools (for example, tools T which will be described later) that may be used in the machine tool; a tool detection means (for example, a tool detection portion 23 which will be described later) which detects a tool selected in the machine tool; and a magnetic flux amount setting means (for example, a magnetic flux amount setting portion 24 which will be described later) which commands the command transmission means to read, from the storage means, a magnetic flux amount corresponding to the tool detected by the tool detection means and to output the magnetic flux amount to the spindle control portion.

(2) In the numerical control device of the machine tool according to (1), the tool selected in the machine tool may be a tool for drilling.

According to the present invention, a magnetic flux command for a spindle motor is changed as necessary according to a tool being selected, and thus it is possible to provide the numerical control device of a machine tool which can achieve both a reduction in heat generation and stability in heavy cutting.

BRIEF DESCRIPTION OF THE DRAWINGS

FIG. 2 is a flowchart showing the operation of the numerical control system according to the first embodiment of the present invention.

DETAILED DESCRIPTION OF THE INVENTION

Figure 1:
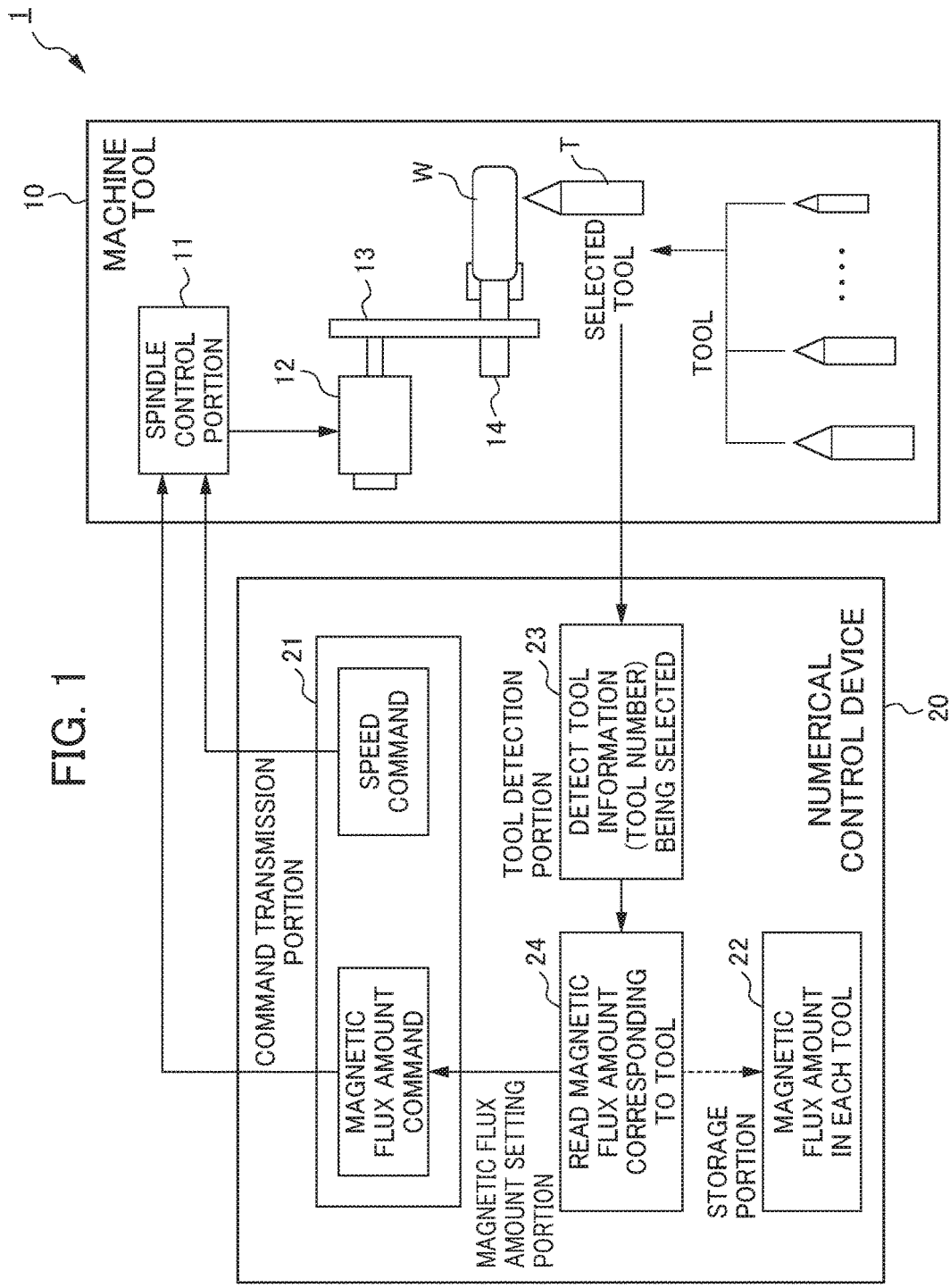
FIG. 1 is a diagram showing the configuration of a numerical control system according to a first embodiment of the present invention.

A first embodiment of the present invention will be described below with reference to drawings.

First Embodiment

FIG. 1 is a diagram showing the configuration of a numerical control system according to a first embodiment of the present invention. FIG. 2 is a flowchart showing the operation of the numerical control system according to the first embodiment of the present invention.

As shown in FIG. 1, the numerical control system 1 according to the first embodiment is configured with a machine tool 10 and a numerical control device 20. The machine tool 10 includes a spindle control portion 11 such as an amplifier, a spindle motor 12, a torque transmission device 13 and a spindle 14. When in a state where a work W is fitted to the spindle 14, a drive current is output from the spindle control portion 11 to the spindle motor 12, the torque of the spindle motor 12 is transmitted through the torque transmission device 13 to the spindle 14, and thus the work W is rotated. In this state, a tool T is brought into contact with the work W, and thus the work W can be cut with the tool T.

As the spindle motor 12, an induction motor is used. In a case where as described above, the induction motor is used as the spindle motor 12, as described previously, it is likely that when in order for heat generation to be reduced, the magnetic flux of the induction motor is reduced at the time of light load, stability in heavy cutting is not provided.

Hence, in order to prevent the occurrence of such inconvenience, as shown in FIG. 1, the numerical control device 20 includes a command transmission portion 21 serving as a command transmission means, a storage portion 22 serving as a storage means, a tool detection portion 23 serving as a tool detection means and a magnetic flux amount setting portion 24 serving as a magnetic flux amount setting means.

The command transmission portion 21 transmits a speed command value and a magnetic flux amount command value to the spindle control portion 11 of the machine tool 10.

The storage portion 22 is incorporated in the numerical control device 20, and stores magnetic flux amounts $\Phi$ corresponding to tools T which may be used in the machine tool 10.

The tool detection portion 23 detects, among the tools T which may be used in the machine tool 10, the tool T which is selected in the machine tool 10. A specific method thereof will be described later.

The magnetic flux amount setting portion 24 reads, from the storage portion 22, the magnetic flux amount $\Phi$ corresponding to the tool T detected by the tool detection portion 23, and commands the command transmission portion 21 to output the magnetic flux amount $\Phi$ to the spindle control portion 11 of the machine tool 10.

Then, the operation of the numerical control system 1 will be described with reference to FIG. 2. For example, the operation is performed immediately before the execution of a machining program.

In step S1, the tool detection portion 23 detects, among the tools T which may be used in the machine tool 10, the tool T which is selected in the machine tool 10. Specifically, the tool detection portion 23 reads a tool number from the machining program with reference to the machining program executed in the machine tool 10, and detects, as the selected tool, the tool T corresponding to the tool number.

In step S2, the magnetic flux amount setting portion 24 reads, from the storage portion 22, the magnetic flux amount $\Phi$ corresponding to the tool T detected by the tool detection portion 23.

In step S3, the magnetic flux amount setting portion 24 commands the command transmission portion 21 to output the magnetic flux amount $\Phi$ to the spindle control portion 11 of the machine tool 10. The command transmission portion 21 receives the command so as to output the magnetic flux amount $\Phi$ to the spindle control portion 11 of the machine tool 10.

As described above, although the maximum cutting load differs depending on the type, the size and the like of the tool T, in the numerical control system 1, a magnetic flux (excitation current) command is changed according to the tool T being selected (when the tool T which may perform heavy cutting is selected, the magnetic flux is previously increased), and thus in the numerical control device 20 of the machine tool, it is possible to achieve both a reduction in heat generation and stability in heavy cutting.

In particular, as compared with a case where the surface of the work W is cut away with a milling tool T which is used in milling or the like, in a drilling tool T which is used in a drilling application, a contact area at the start of contact with the work W is large. Hence, a load is rapidly increased, and thus the speed of the spindle 14 is often lowered or stopped, with the result that the necessity to increase the magnetic flux amount $\Phi$ is high. Therefore, in the drilling tool T described above, the present invention is useful.

Basically, when the same machining is performed with the same type of tool T, as the diameter of the tool T is increased, the load is increased, so that the magnetic flux amount $\Phi$ is preferably increased. Therefore, even in this case, the present invention is useful.

OTHER EMBODIMENTS

Although the embodiment of the present invention is described above, the present invention is not limited to the embodiment described above. With regard to the effects described in the present embodiment, the most preferred effects produced from the present invention are merely listed, and the effects of the present invention are not limited to the effects described in the present embodiment.

For example, in the description of the first embodiment discussed above, when the tool detection portion 23 of the numerical control device 20 detects the tool T which is selected in the machine tool 10, the tool detection portion 23 detects the tool T based on the tool number in the machining program. However, the method of detecting the tool T is not particularly limited. For example, a configuration may be adopted in which barcodes are attached to all of the tools T, in which the barcodes are read with a barcode scanner (barcode reader) and in which thus the tools T are detected. Alternatively, the tool T may be detected by reading the tool T itself with an image sensor.

Although in the first embodiment discussed above, the case where the storage portion 22 is incorporated in the numerical control device 20 is described, the storage portion 22 does not necessarily need to be incorporated in the numerical control device 20. For example, a necessary magnetic flux amount $\Phi$ may be acquired through a network from the storage portion 22 which is provided on a cloud.

EXPLANATION OF REFERENCE NUMERALS 1 numerical control system
10 machine tool
11 spindle control portion
12 spindle motor
13 torque transmission device
14 spindle
20 numerical control device
21 command transmission portion (command transmission means)
22 storage portion (storage means)
23 tool detection portion (tool detection means)
24 magnetic flux amount setting portion (magnetic flux amount setting means)
T tool
W work

What is claimed is:

1. A numerical control device of a machine tool which controls the machine tool including a spindle control portion for driving a spindle motor, the numerical control device comprising:
   a command transmitter to transmit a speed command value and a magnetic flux command value to the spindle control portion;
   a memory to store magnetic flux amounts corresponding to each of a plurality of drilling tools that may be used in the machine tool;
   a tool detector to detect a drilling tool selected in the machine tool; and
   a magnetic flux amount setter that commands the command transmitter to read, from the memory, a magnetic flux amount corresponding to the drilling tool detected by the tool detector and to output the magnetic flux amount to the spindle control portion, wherein
   the larger the diameter of the drilling tool detected by the tool detector is, the larger the magnetic flux amount corresponding to the drilling tool is.

* * * * *